Aug. 27, 1968    J. M. M. HOEBERIGS    3,398,672
AUTOMATIC DISTRIBUTOR OF FRIED FOODS
Filed Feb. 18, 1966    3 Sheets-Sheet 1

INVENTOR
JEAN MARIE M. HOEBERIGS
BY
Stevens, Davis, Miller & Mosher
ATTORNEYS

Aug. 27, 1968  J. M. M. HOEBERIGS  3,398,672
AUTOMATIC DISTRIBUTOR OF FRIED FOODS
Filed Feb. 18, 1966  3 Sheets-Sheet 3

INVENTOR
JEAN MARIE M. HOEBERIGS
BY

*Stevens, Davis, Miller & Mosher*
ATTORNEYS

_United States Patent Office_

3,398,672
Patented Aug. 27, 1968

3,398,672
AUTOMATIC DISTRIBUTOR OF FRIED FOODS
Jean Marie M. Hoeberigs, 72 Eeuwfeestlaan,
Heist-Duinbergen, Belgium
Filed Feb. 18, 1966, Ser. No. 528,455
Claims priority, application Belgium, Mar. 1, 1965,
660,415
13 Claims. (Cl. 99—407)

ABSTRACT OF THE DISCLOSURE

An automatic dispenser for freshly fried foods comprising a conveyor having thereon a plurality of food containers, a cooking cauldron, a ladle and means to transfer the food from the containers to the ladle. The conveyor is mounted adjacent the couldron with the transfer means located generally above the ladle so that the food will fall from the containers to the ladle by gravity. The ladle is pivotally mounted to selectively descend into the cooking cauldron, wherein the food is cooked, and to ascend and invert to pass the cooked food to a dispensing station.

---

The invention relates to an automatic distributor of fried foods, in particular of French fried potatoes, hereinafter named chips, comprising a switch controlled stepping conveyor and a heatable cauldron for the frying fat, wherein dips a chips ladle, means being provided for the transfer of the foods to be fried, supplied by the conveyor to the chips ladle and for the transfer of the food fried in said ladle towards a hatch.

The main object of the invention is to provide an automatic distributor of simple construction and operation, in which the provision of food portions can be very important, so that the moments of reprovisioning can be at longer intervals. In addition, the method of reprovisioning is very much eased. For that purpose, the conveyor is provided with a series of carriers used to contain the portions of food located at a given distance the ones from the others, said means being provided with a tilting mechanism cooperating with the conveyor for tilting the carriers.

The conveyor is provided in a suitable manner with an endless chain running over sprocket wheels, from which the carriers are depended while being able to rotate around a pin located above the center of gravity of each carrier.

In an advantageous form of embodiment of the invention, each carrier is provided with a guiding member cooperating over a specific distance of the conveyor path with a control member fixed with reference to the distributor and located on the conveyor path, the shape of the guiding member and of the fixed control member being such that the carrier is subject to a rotation around its said axis.

In a particular form of embodiment of the invention, the control member comprises a fixed control cam, while the guiding member comprises a disk coaxial with the axis of rotation of the carrier and secured to the latter.

In a particularly advantageous form of the embodiment of the invention, the tilting mechanism is provided with a spocket wheel on which the chain is subjected to a change of direction, so as to bring the control cam inside the elbow of the chain formed by this change of direction, the distance, inside the elbow, from the chain to the active edge of the control cam corresponding approximately to the radius of the disk.

Other features and advantages of the invention will become apparent from the description hereinafter of a form of embodiment of an automatic distributor according to the invention, this description is only given by way on non limiting example, the references relate to the schematic drawings accompanying the specification.

Figure 1:
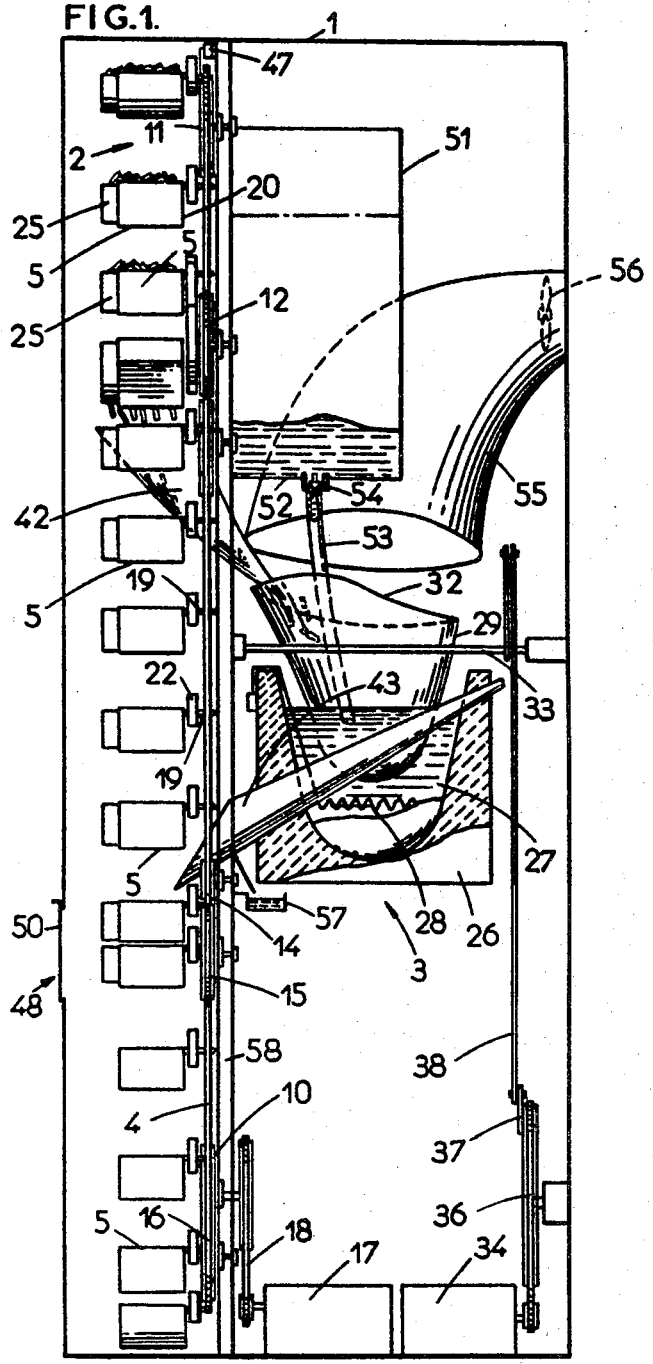
FIG. 1 is a front view partly broken away of a form of embodiment according to the invention.

The figures show an automatic distributor for chips comprising substantially a casing 1 wherein a conveyor 2 and a frying appliance 3 are provided.

The conveyor 2 comprises a closed chain 4 from which depend carriers 5 at regular intervals from each other. Said chain 4 passes successively over a series of sprocket wheels 6 to 16. Some of these sprocket wheels are mounted at the top part of the casing 1 and others are mounted at the bottom part thereof, the chain moving alternately over a top and a bottom sprocket wheel. Thus the chain 2 is alternately subjected to a vertical ascending and descending motion. The drive of the conveyor 2 is carried out by means of a belt or chain transmission 18, by means of a motor 17 located in the bottom of casing 1.

The carriers 5 depended from the chain 4 are of semi-cylindrical shape taken along the axis of symmetry and are secured to a journal 19 mounted on the chain, said journal extending according to the said axis of symmetry and being mounted in a rotating manner on the rear vertical edge 20 of support 5.

Figure 3:
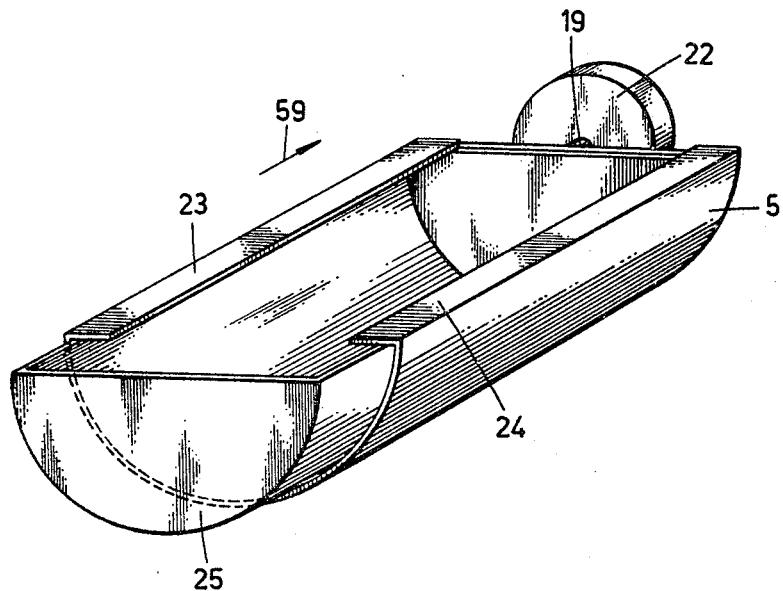
FIG. 3 is a perspective view of a carrier and its associated trough.

In a coaxial manner with the journal 19 there is provided a circular disk 22 between chain 4 and the rear edge 20, secured against the latter and swivelling on the journal 19 by means of a ball bearing, while the front face of the carriers 5 located facing the rear wall 20 is open. In addition, the two side walls are each provided with a lip 23 and 24 directed inwards. As shown in FIG. 3, a trough 25 may be slipped into the carrier 5, in the direction of the arrow 51. The upper edges of the trough 25 will engage with the lips 23 and 24 in order to retain the trough in the carrier when the assembly is tilted for dispensing the food contained therein.

Figure 2:
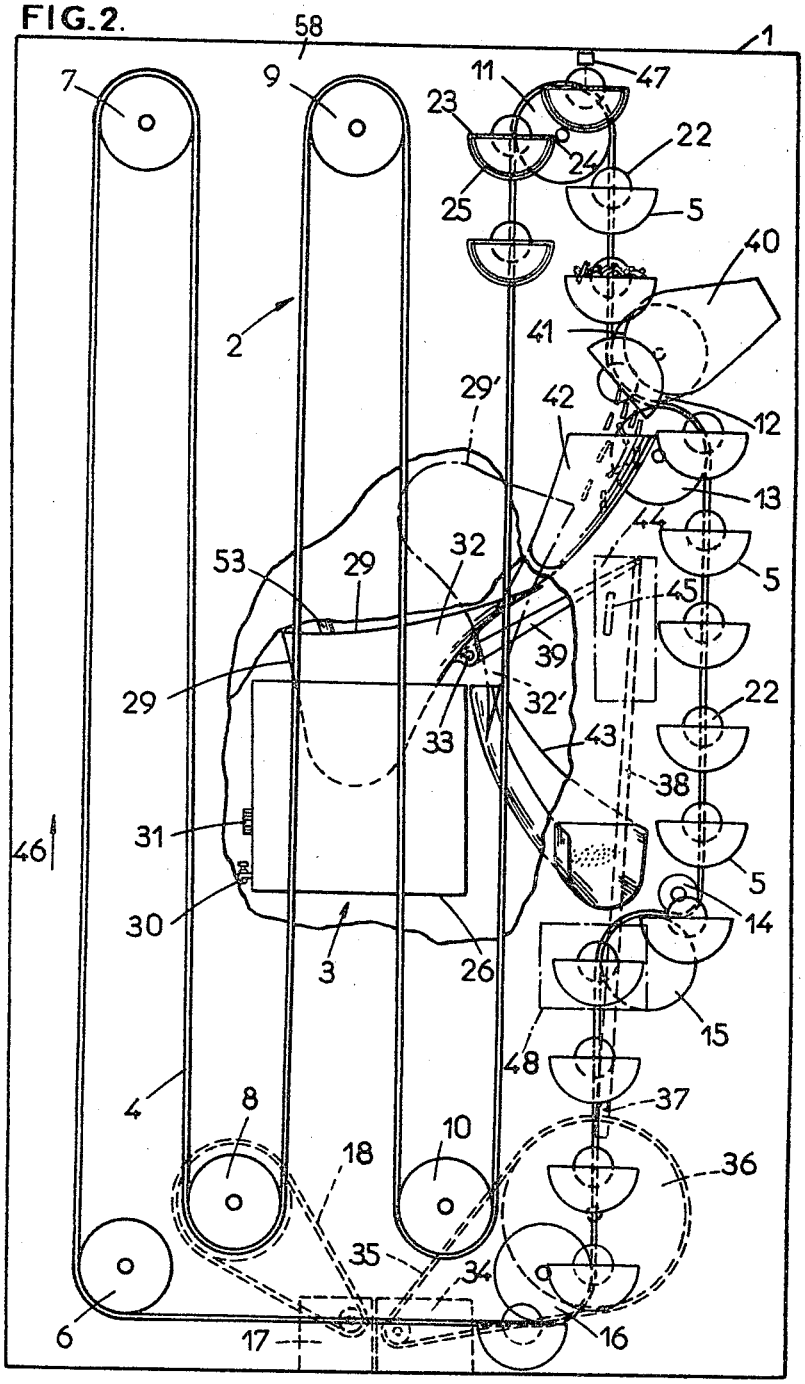
FIG. 2 is a lateral view of the form of embodiment according to FIG. 1.

About halfway up casing 1, there is provided behind the conveyor 2, the frying appliance 3 for the chips. Said appliance comprises a fixed cauldron 26 containing the fat 27, wherein dips an electric heating element 28, and a perforated chip ladle 29 depended in the fat 27. At the bottom of cauldron 26 is a drain-cock 30 and alongside the latter a temperature regulator 31. One side of the edge of the perforated chips ladle 29 is provided with an inclined extension 32, which extends obliquely towards the area wherein moves the conveyor 2. The extension 32 of said perforated chips ladle 29 is secured on a swivelling pin 33, which extends at right angles to the vertical plane wherein moves chain 4, and is located above the edge of cauldron 26. Said pin 33 is driven by motor 34 through the intermediary of a conrod-crank system. The latter comprises a belt or chain transmission 35, which drives a disk 36 on which is secured a conrod 37, articulated on an intermediate conrod 38, which, in its turn, pivots with a fixed conrod 39 mounted on the pin 33 at right angles to the latter. The chips ladle 29 can thus take up two extreme positions during one revolution of disk 36; the first position, shown in full lines, corresponds to the frying of the chips, while the second position, shown in dash lines in FIG. 2, corresponds to the draining of the ladle 29.

In the part of the casing 1, above the frying appliance 3, is provided a tilting mechanism for the carriers 5. Said mechanism comprises two sprocket wheels 12 and 13 located one above the other and rotating freely, on which the chain 2 is subject to a change of direction and a control cam 40 located inside the elbow formed by the change of direction of the chain 2. The distance from the chain 2 to the active edge 41 of the control cam 40 corresponds substantially to the radius of the disk 22. Thus, during the movement of the chain 2 over the sprocket wheel 12, the disk 22 of carrier 5 mounted on that part of the chain is applied simultaneously against the edge 41 of the control cam 40, so that said disk 22 runs along said edge 41 thus bringing about the tilting of said carrier 5. This part of the chain 2 is subsequently guided by sprocket wheel 13, the disk 22 of said carrier 5 being thus removed from the edge 41, so that the carrier 5 returns automatically to its initial horizontal position. At a lower level, the chain 2 experiences a change of direction, contrary to the change of direction mentioned hereinbefore by the passage of chain 2 over the sprocket wheels 14 and 15.

Below the tilting mechanism there is provided an inlet duct 42 inclined towards the chips ladle 29 and fixed with reference to the distributor, which extends from below the carrier 5 to be tilted as far as the extension 32 of the edge of the chips ladle 29, while a second similar duct 43, termed a discharge duct, extends substantially symmetrically with reference to the horizontal plane passing through the pin 33 and is located above the elbow of chain 2 made up by the sprocket wheels 14 and 15. The ducts 42 and 43 are therefore located in such a manner that, in the first position of the chips ladle 29, the extension 32 inclined from the edge of the latter reaches the lower portion of the inlet duct 42 and, in the second position, the top part of the discharge duct 43.

Between the two ducts there is provided in the casing 1 space to mount a switch system 44, which starts the distributor running on the introduction of a coin in the slit 45.

The operation of the distributor is carried out as follows. On introducing a coin in the slit 45 the switch 44 operates a time switch and the motor 17 starts to run; by means of said motor, the conveyor 2 is displaced according to the arrow 46 over a distance corresponding to the distance between two successive carriers 5. The stop of the conveyor 2 is achieved by means of a relay, which, on a carrier 5 passing over a sprocket wheel 11, is operated by spring contact 47. The latter is located between the chain and the wall 58 on which are mounted the different sprocket wheels 6 to 16, facing chain 4, and cooperates with the free end of pivot 19 projecting at the back of chain 4, in order to bring conveyor 2 automatically to a stop. A carrier 5 is thus made to tilt by the tilting mechanism, so that the fried potatoes of trough 25, located in said carrier 5, fall in the inlet duct 42 and are brought by the extended edge 32 into the chips ladle 29. By means of the afore-mentioned time switch, the motor 34 is started after a specific time and the disk 36 carries out a complete revolution, so that the chips ladle 29 carries out a rotation around the pin 33. In this manner, the chips ladle 29 is removed from the fat, as shown in dash lines on FIGURE 2, in order to be brought back to its initial position during the second part of the revolution of disk 36. In this manner, the chips are guided along the extended edge 32 towards the discharge duct 43 from where they fall in an empty trough 25 located below and held in a carrier 5 which is at rest at the level of a hatch 48. The hatch is closed by a sliding plate 50.

After the complete revolution of disk 36, motor 34 is stopped at the same time as the hatch 48 is unlocked by means of a double acting relay not shown on the drawings. The unlocking of the hatch 48 is announced by means of a small indicator light, so that, at that moment, disk sliding plate 50 of hatch 48 can be lifted and the trough 25 with the fried chips can be withdrawn from the casing 1. On the hatch being closed, the distributor is brought back to the state of rest and the cycle may start again.

The troughs 25 are designed in such a manner that, once they are placed in the carriers 5, they project slightly from the open side of said carriers. It is thus possible to check automatically, by means of a photoelectric cell, the number of chips portions inside the distributor.

The distributor according to the invention is also provided with a supply cauldron 51 containing liquid frying fat. In the bottom 52 of said cauldron 51 is provided a pipe 53 which extends as far as the level 27 of the fat inside the cauldron 26. By means of a valve system 54 provided in the bottom 52 between the pipe 53 and the cauldron 51, the fat 27 inside the cauldron 26 is kept at constant level. In addition, an exhaust flue 55 with a ventilator 56 mounted inside the latter, is provided above the cauldron 26 to exhaust the fat vapors, while openings can be provided inside the chips discharge duct 43 to permit the discharge of excess fat brought along with the chips, which is collected inside a groove 57.

The distributor according to the invention makes it possible to divide beforehand the chips which have passed a first time through the frying fat, into portions in troughs 25 and to slide the latter at any time inside the carriers 5 of the distributor. The same troughs 25 therefore also serve the client, so that it is not necessary to provide a special carrier system for the containers. The perforated chips ladle 29 is of simple shape which permits easy fabrication. Also the store can comprise 100 portions without the dimensions of the casing 1 becoming excessive. Said casing 1 can also, by modifying its width, be aligned with other automatic distributor appliances, such as for example automatic coffee distributors.

The invention is evidently in no way limited to the form of embodiment described hereinbefore, and, within the framework of the present invention, many modifications may be made to the form of embodiment described hereinbefore as regards the shape, the composition, the disposition and the number of elements used to implement the invention.

I claim:

1. An automatic dispenser for freshly fried foods comprising a casing having a conveyor means and frying means therein, said conveyor having a plurality of carrier means mounted thereon at regular spaced intervals, food container means removably mounted in said carrier means, a tilting mechanism located adjacent said conveyor and above said frying means for discharging food from said container means into said frying means, said frying means comprising a heatable cauldron, said cauldron being adapted to receive a quantity of frying fluid therein, perforated ladle means pivotally mounted to receive said food from said container means, lower said food into said frying fluid, and discharge cooked food therefrom to a position readily accessible to customers.

2. An automatic dispenser for freshly fried foods according to claim 1, in which means are provided, at the level of said tilting mechanism, for changing the direction of said conveyor, said carrier means being pivotally mounted on said conveyor about a horizontal axis, a disk coaxial with the axis of rotation of each said carrier and integrally secured thereto, said tilting mechanism comprising a control cam mounted closely adjacent to said conveyor at said direction changing means, at a distance corresponding to the radius of said coaxial disk whereby each said carrier will be tilted by said cam during passage by said direction changing means.

3. An automatic dispenser for freshly fried foods according to claim 2 further comprising a plurality of sprocket wheels parallelly mounted spaced apart in said casing, said conveyor passing about said sprocket wheels in a serpentine manner whereby a great length of conveyor can be contained in a relatively small casing.

4. An automatic dispenser for freshly fried foods according to claim 2 in which each said carrier means is channel shaped with one end being closed, said closed end being mounted towards said conveyor with said disk therebetween the other end of said carrier means being open, said carrier means projecting substantially perpendicularly from said conveyor means.

5. An automatic dispenser for freshly fried foods according to claim 4 in which the upstanding walls of said channel shaped carrier means are provided with inwardly directed flanges, said flanges guiding and holding said container means in said carrier means during tilting.

6. An automatic dispenser for freshly fried foods according to claim 1 in which said perforated ladle means is pivotally mounted on pin means which is substantially at a right angle to the direction of travel of said conveyor, said ladle means being moveable between a first position in which at least its lower end is immersed in said frying fluid and a second position, rotated about said pin, in which it is totally withdrawn from said frying fluid and substantially inverted to discharge food contained therein.

7. An automatic dispenser for freshly fried foods according to claim 6 in which the axis of rotation of said perforated ladle means is located adjacent to and to one side of an upper edge of said cauldron.

8. An automatic dispenser for freshly fried foods according to claim 7 in which one edge of the open end of said perforated ladle means is extended to form a flange inclined towards the exterior of the casing with reference to the cauldron.

9. An automatic dispenser for freshly fried foods according to claim 8 in which said ladle means flange extends obliquely to the axis of rotation of said ladle.

10. An automatic dispenser for freshly fried foods according to claim 1 further comprising an inclined inlet duct fixedly mounted below said tilting mechanism to thereby guide food discharged from the tilted carrier and contained into said ladle means, and an inclined discharge duct fixedly mounted adjacent said cauldron and extending towards said conveyor whereby food discharged from said ladle means will be guided into an empty carrier and container.

11. An automatic dispenser for freshly fried foods according to claim 10 in which one edge of the open end of said ladle means is provided with an outwardly directed, tapering flange, in a first position of said ladle means said flange lying adjacent the bottom end of said inlet duct and in a second position of said ladle means said flange lying adjacent the top end of said discharge duct, said flange in each position having the same inclination as said ducts.

12. An automatic dispenser for freshly fried foods according to claim 1 further comprising means to feed frying fluid to said cauldron and maintain said fluid at a constant level.

13. An automatic dispenser for freshly fried foods according to claim 1 further comprising means to control the temperature of said frying fluid in said cauldron.

References Cited

UNITED STATES PATENTS

| | | | |
|---|---|---|---|
| 1,369,266 | 2/1921 | Purdy | 99—405 X |
| 2,004,500 | 6/1935 | Burnelle | 99—407 |
| 2,108,627 | 2/1938 | Tyler | 99—407 X |
| 2,123,663 | 7/1938 | Roach | 99—407 X |
| 2,238,972 | 4/1941 | Chapman | 99—407 X |
| 2,616,359 | 11/1952 | Pierson | 99—404 |
| 2,906,850 | 9/1959 | Meletio et al. | 99—407 X |
| 3,274,920 | 9/1966 | Benson | 99—404 |
| 3,291,035 | 12/1966 | Ignelzi | 99—357 |

FOREIGN PATENTS 938,050  9/1963  Great Britain.

BILLY J. WILHITE, *Primary Examiner.*